Feb. 28, 1967 E. W. FISHER 3,306,621
VALVE STEM SEAL
Filed March 17, 1964
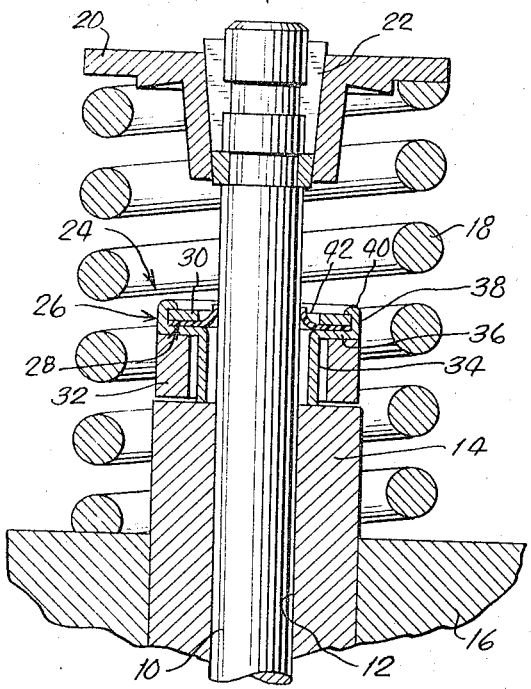
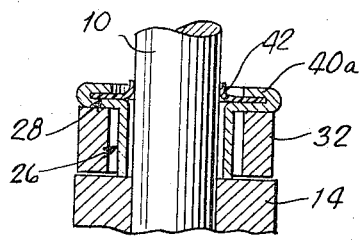
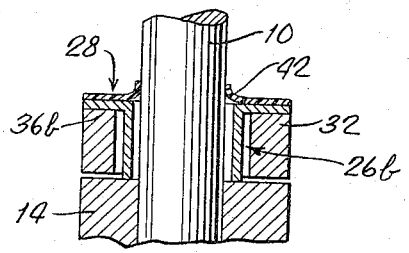
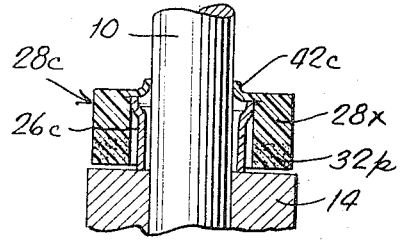
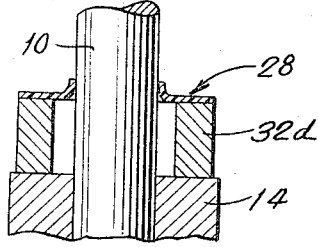
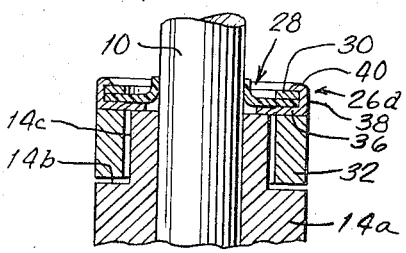
INVENTOR:
EDWARD W. FISHER
BY Robert Henderson
ATTORNEY

United States Patent Office 3,306,621
Patented Feb. 28, 1967

3,306,621
VALVE STEM SEAL
Edward W. Fisher, Palmyra, N.Y., assignor to Garlock Inc., Palmyra, N.Y., a corporation of New York
Filed Mar. 17, 1964, Ser. No. 352,559
14 Claims. (Cl. 277—80)

This invention relates to seals for stems by means of which movable valve elements are actuated. More particularly, it relates to improved means for sealing such a stem against the ingress of deleterious foreign matter therealong to the valve element and its coacting valve seat or a related valve chamber; also for minimizing movement of oil along such a valve stem where an oil bath is provided adjacent to the stem and for filtering ferrous particles from the oil.

For illustrative purposes and without limiting the invention thereto, several embodiments of this invention are disclosed herein as applied to stems of reciprocating valves such as are employed in internal combustion engines.

An important object of this invention is the provision of a valve stem seal which is easily applied to the stem and effectively held to a valve stem guide in self-centering sliding relation to the stem.

Another important object is the provision of such a seal which opposes movement of foreign matter along the valve stem both by a wiping action and by magnetic action.

Another important object is the provision of such a seal which is simple in design and can be economically manufactured.

The foregoing, and other more or less obvious objects are accomplished by seals according to this invention, several forms of which are illustrated in the accompanying drawing.

In said drawing:

FIGURE 1 is a fragmentary view of a reciprocating valve stem and includes a sectional view of a related valve guide member and appurtenant parts.

FIGS. 2–6 are somewhat similar but more rudimentary views, each illustrating a different further embodiment of this invention.

Referring to FIG. 1, illustrating a first embodiment, the valve stem 10, reciprocated by a cam or rocker arm (not shown), is slidably guided in a bore 12 in a valve guide member 14 which may either be integral with an engine block 16 or may be rigidly and fluid-tightly fitted into the latter. A valve element (not shown) and the stem 10 to the lower end of which such an element is integrally fixed are yieldably held in closed position of the valve by a coil spring 18, compressed between the engine block 16 and an annular spring seat element 20 which is secured to the upper or outer end of the stem by a suitable keeper 22.

A seal 24, according to the invention, is shown in association with the valve stem and its guide member and comprises a sheet metal sleeve 26, an annular flexible sealing element 28, a washer 30, and a cylindrical magnet 32.

The sleeve 26 is of steel or other magnetic metal and comprises a cylindrical portion 34 freely encircling the stem 10, a radial flange 36 integral with the upper end of portion 34 and extending radially outwardly therefrom, a cylindrical flange 38 integral with and extending upwardly from the outer margin of the radial flange 36, and a rolled-in annular lip 40, integral with the upper margin of the cylindrical flange 38.

The washer 30 is a flat annulus of rigid material, preferably metal. The flexible sealing element 28, fundamentally, is a flat annulus of suitable resilient packing material which advantageously may be a plastic material, as, e.g., polytetrafluoroethylene. The outer margin of the sealing element 28 is clamped between the washer 30 and the lip 40. The sealing element, as initially formed, has an inside diameter somewhat less than the diameter of the stem 10, and its resiliency is such that when the device is installed by being slid onto the stem, the latter spreads and upwardly flares an inner marginal portion 42 of the sealing element to a larger inside diameter so that it slidably engages the cylindrical surface of the stem with a good, positive fit. The resiliency of the marginal portion 42 is such as to maintain that fit and substantially to hold the sleeve 26 concentric to the stem 10.

The magnet 32 may be bonded to the underside of the flange 36 of the metal sleeve although its magnetism may be utilized to maintain its proper association with related parts, as hereinafter explained. The length of the magnet should correspond approximately to the length of the sleeve's cylindrical portion 34. The magnetic properties of the magnet and of parts with which it coacts are such as to enable the device to function in the manner now to be explained.

In operation, the seal is magnetically held down upon the valve guide member 14 by the magnet 32 which exerts magnetic attraction at its upper end, between it and the radial flange 36, and, at its lower end, between it and the upper end of the valve guide member. Said flange and guide member, ordinarily, are of magnetic material, otherwise, for the purposes of this invention, they would have suitable inserts of magnetic material affixed thereto.

The magnetic strength of the magnet suffices to hold the seal down upon the valve guide member 14 despite friction present between the flexible sealing element 28 and the valve stem 10 during reciprocation of the latter. The provision of the required relationship between the magnet's strength and such friction may be facilitated by forming the flexible sealing element 28 of low friction material such as, e.g., polytetrafluoroethylene or a compound of the latter which may give the flexible sealing element its desired resiliency and durability as well as its low friction characteristics.

The marginal portion 42 of the flexible sealing element constitutes a flared, annular sealing lip extending in a direction away from the stem's related valve element, thus being positioned to oppose, effectively, the downward movement of foreign matter or excess oil along the stem 10 toward the valve element.

In some cases, particularly as in automobile engines, the upper end of the stem 10 works in a bath of oil circulated to and from cams or rocker arms which operate the valve, hence, the function of the seal is important for preventing an excess of oil, from the bath, from moving downwardly within the valve guide and along the stem 10 to the latter's related valve element.

The magnet 32, in addition to holding the seal in proper association with the guide member 14, serves as a filter in that it magnetically attracts and retains ferrous particles that may be in oil which comes within the vicinity of the seal. Thus, any oil which may find its way to the valve stem 10, below the sealing lip 42, is freed of such particles so that the oil functions for lubricating purposes with minimum wear on relatively movable parts of the valve assembly. The seals, being located near the upper ends of the valve stems are accessible for servicing or replacement as may become necessary.

The second embodiment, illustrated in FIG. 2, differs from the first embodiment only in the omission of washer 30, the lip 40a being rolled in and down tightly, directly upon the outer margin of the flexible sealing element 28.

The third embodiment, illustrated in FIG. 3, differs from the second embodiment in that the flexible sealing element 28 is suitably bonded to the top surface of radial flange 36b of metal sleeve 26b; the cylindrical flange 38 of the first embodiment and the rolled-in lips 40 and 40a of the first and second embodiments being omitted.

A seal according to a fourth embodiment, is illustrated in FIG. 4, and comprises a sheet metal sleeve 26c, flared outwardly circumferentially at its upper end, and, at that end, disposed tightly, and preferably bonded, within a cylindrical base portion 28x of an annular flexible sealing element 28c having an integral sealing lip 42c functioning similarly to the sealing lips 42 of the previously described embodiments. The sealing element 28c also functions as a magnet. For that purpose, it may be made of suitable packing material, which may be a plastic material such as polytetrafluoroethylene suitably compounded to provide the proper sealing and centering qualities of the lip 42c; but the element 28c, at least in its lower area, may be filled with magnetic particles 32p. Such filling should constitute a distribution of the particles in the sealing element and should be of such degree that the base portion 28x will maintain its magnetic attraction to the guide member 14. The outward flaring of the sleeve 26c is such that the latter is spaced from the valve stem 10 and also is spaced from the base portion 28x except at its flared upper end. The space between the sleeve 26c and the base portion 28x should preferably extend to a level above the area filled with the magnetic particles 32p.

A seal according to a fifth embodiment is illustrated in FIG. 5 as comprising only a cylindrical magnet 32d, held down by magnetism upon the guide member 14, and an annular, flexible sealing element 28 of polytetrafluoroethylene bonded concentrically upon the top of the magnet.

A seal according to a sixth embodiment is illustrated in FIG. 6 to show the adaptability of this invention for use where the top of the valve guide member is annularly rabbeted. The seal itself differs from the seal of FIG. 1 chiefly in the omission of the cylindrical portion 34, so that, in form, the metal element 26d is merely a clamping annulus having a cylindrical portion 38, an inwardly extending radial flange 36 underlying the outer marginal portion of the sealing element 28 and resting upon the top of the valve guide member 14a, and a rolled-in lip 40 clamping the washer 30 and, more particularly, said marginal portion of the sealing element down upon the flange 36. The magnet 32 may either be bonded to the flange 36 or, assuming the latter to be of magnetic material, may be held in association with said flange magnetically.

In use of a seal according to the sixth embodiment, the annular magnet 32 extends within annular rabbet 14b of the guide member 14a in spaced relation to the cylindrical surface 14c defining said rabbet. The reduced upper end of the guide member 14a enhances the flow of magnetic forces through and about the magnet in much the same way as such flow is enhanced by the cylindrical portions of the metal sleeves 26, 26b, and 26c shown in FIGS. 1 to 4, inclusive.

Although the cylindrical portions of the metal sleeves 26, 26b, and 26c are disclosed herein as disposed within a related annular magnet, it should be understood that equivalent metal sleeves may be provided with cylindrical portions extending about the outside of the magnet in spaced relation to the latter's outer cylindrical surface.

It should be clear, to those familiar with the art relating to such sealing devices, that the concepts disclosed herein may be practiced in various other ways without departing from the invention as set forth in the following claims.

I claim:

1. In combination, a relatively stationary cylindrical guide member comprising magnetic material, a valve stem reciprocable within and guided by said guide member with a projecting portion of the valve stem extending from an end thereof, an annular sealing element in sliding, sealing engagement about and with said projecting portion, and holding means opposing axial movement of said sealing element; said holding means comprising a magnet, and a connection, connecting said magnet to said sealing element; said magnet being in such magnetic relation to the magnetic material of the guide member as to hold the magnet against material movement relatively to the guide member and to hold the sealing element against material movement with the valve stem.

2. The combination according to claim 1, said guide member being formed with an annular rabbet at its upper end, defined by a cylindrical surface and a flat, radially extending bottom surface, and said magnet being cylindrical, and disposed substantially within said rabbet with its inside cylindrical surface spaced from said cylindrical surface of the guide member and the bottom of the magnet in magnetically attractive juxtaposition to said bottom surface of said rabbet.

3. The combination according to claim 2, said connection comprising an annulus, of magnetic material, within which the outer margin of the sealing element is retained, the latter annulus including a radially extending flange underlying the sealing element and engaged upon a radial surface of the guide member at the top of said rabbet, said guide member being generally cylindrical, and said magnet and said connection annulus being of diameters no greater than the general diameter of the guide member.

4. The combination according to claim 1, said magnet being cylindrical with an inside diameter greater than the diameter of said projecting stem portion, providing a cylindrical space between the latter portion and the magnet; the combination further including a sleeve of magnetic material within said space with a lower portion of said sleeve clear of both said magnet and said projecting stem portion, the upper end of said sleeve being fixed to said connection, and the lower end of said sleeve being in engagement with said guide member.

5. The combination according to claim 1, said magnet comprising magnetic particles distributed within the sealing element to cause the latter to adhere magnetically to the guide member.

6. The combination according to claim 1, said sealing element comprising a flat annulus having a flared, resilient sealing lip, an inner annular portion of which extends axially from one face thereof, away from said guide and into said engagement with the valve stem, and said magnet being annular and bonded to the opposite face of said flat annulus.

7. The combination according to claim 1, said magnet being annular, and the inside diameter of said magnet being substantially greater than the diameter of said valve stem whereby to provide a space, between said magnet and stem, for receiving therewithin an adjacent portion of said guide member.

8. The combination according to claim 1, said magnet being cylindrical and of low-friction plastic material with magnetic particles distributed therethrough toward one end thereof and said sealing element comprising an inwardly extending annular sealing lip, integral with said magnet at the latter's other end.

9. The combination according to claim 1, said connection being magnetic.

10. The combination according to claim 1, said connection being a bonding of the magnet to the sealing element.

11. The combination according to claim 1, said sealing element including an annular, resilient sealing lip extending in one axial direction and a rigid sleeve of magnetic-conductive material extending in the opposite axial direction and extending freely about the valve stem; and said magnet being annular being in spaced coaxial relation to said sleeve and being approximately coextensive axially therewith.

12. The combination according to claim 11, said sealing element comprising a flat annulus from an inner portion of which said sealing lip extends axially upwardly, and said sleeve having an outwardly extending radial flange of magnetic material underlying said annulus, and an outer marginal portion of said flange being circumferentially rolled upwardly and inwardly into clamping relation with an outer peripheral portion of the annulus; said magnet being magnetically held against said flange to constitute said connection.

13. A seal for a valve stem reciprocating in a guide member, said seal comprising an annular sealing element, of low-friction sealing material, having a sealing surface at its inner periphery adapted to slidably and sealingly engage the valve stem, a sleeve, of magnetic-conductive material, having a cylindrical portion extendible freely about the valve stem, and a flange at one end of said portion, extending radially outwardly from the latter and fixed in face-to-face relation to an outer, peripheral, marginal portion of said sealing element, and a cylindrical magnet in spaced coaxial relation to said cylindrical portion; one end of said magnet being connected to said flange and the magnet being of sufficient magnetic strength to adapt it to magnetically hold the other end of said cylindrical portion against the guide member during reciprocation of the valve stem therein.

14. A seal according to claim 13, the outer margin of said flange being bent axially and radially inwardly into clamping relation to the outer marginal portion of the sealing element.

References Cited by the Examiner
UNITED STATES PATENTS

| | | | |
|---|---|---|---|
| 2,589,766 | 3/1952 | Bradley | 277—80 |
| 2,913,289 | 11/1959 | Stevenson | 277—80 |
| 3,104,916 | 9/1963 | Dowling et al. | 308—3.5 |
| 3,171,659 | 3/1965 | Anderson et al. | 277—212 X |

FOREIGN PATENTS

| | | |
|---|---|---|
| 537,898 | 5/1955 | Belgium. |
| 678,981 | 9/1952 | Great Britain. |

SAMUEL ROTHBERG, *Primary Examiner.*